Patented Sept. 4, 1945

2,384,116

UNITED STATES PATENT OFFICE 2,384,116

UNSATURATED ESTERS AND POLYMERS THEREOF

Irving E. Muskat and Franklin Strain, Akron, Ohio, assignors to Pittsburgh Plate Glass Company, Allegheny County, Pa., a corporation of Pennsylvania No Drawing. Application November 9, 1940, Serial No. 365,102

9 Claims. (Cl. 260—78)

This invention relates to novel compositions of matter, methods of producing such compositions and to the products which may be prepared from such compositions. In accordance with the present invention, we have found that novel products may be obtained from mono hydroxy carboxylic acid esters of unsaturated alcohols by esterification with a suitable polybasic acid. The resulting esters may be polymerized to form polymers having desirable characteristics. Alternatively, they may be used for various purposes, such as plasticizers, solvents, insecticides, etc.

The invention is particularly directed to the carbonic acid esters derived from esters of hydroxy acids, particularly mono hydroxy acids and unsaturated alcohols such as vinyl, allyl, methallyl, ethyl allyl, cinnamyl, crotyl, 2-chloroallyl, chlorocrotyl, propargyl, methyl vinyl carbinyl, tiglyl or isopropenyl vinyl carbinyl alcohol or 3-chlorobutene 2-ol-1, 3-hydroxybutene-1, 3-hydroxy pentadiene-1,4, 1-hydroxy hexadiene-2,4, 1-hydroxy-2-methylhexene-2, or other lower unsaturated alcohol, particularly alcohols containing a polymerizable group.

Esters of various mono hydroxy acids such as lactic acid, alpha, beta or gamma hydroxy butyric acid, glycolic, citric, m or p hydroxy benzoic, malic, hydroxy valeric, salicylic, hydroacrylic, mandelic, hydroxy phthalic, glyceric, α-hydroxy vinylacetic, hydroxy caproic, ricinoleic and other mono hydroxy acids and the abovementioned unsaturated alcohols may be prepared in accordance with the present invention. Similarly, the esters of polyhydroxy acids such as tartaric, mucic, resorcylic, or gluconic acids may be prepared.

In order to prepare the esters herein contemplated the esters of the hydroxy acids may be reacted with phosgene. For example, the allyl or other unsaturated ester of an hydroxy acid may be reacted with phosgene to form a carbonate ester having the probable formula

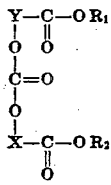

where X and Y are aliphatic, araliphatic or aryl radicals containing a carbon chain, and where R$_1$ and R$_2$ are unsaturated radicals such as unsaturated hydrocarbon or halohydrocarbon or similar unsaturated radicals.

The polyesters thus secured may be considered to be polybasic acid polyesters of a carb-alkenyloxy substituted alcohol. The reaction may be conducted in the presence of suitable esterification catalysts such as benzene or toluene sulphonic acids, etc. In utilizing phosgene the reaction is generally conducted in the presence of a suitable basic agent such as pyridine, or an alkaline agent such as sodium, potassium, calcium, barium, strontium, or magnesium carbonate, bicarbonate or hydroxide. Water or nonaqueous diluents such as acetone, benzene or dioxane may be utilized in order to assist the reaction, if desired. Polymerization inhibitors such as hydroquinone may be utilized to prevent polymerization.

The esters prepared in accordance with the present invention may be recovered from the reaction mixture by distillation, preferably after removal of pyridine hydrochloride, if this compound is present. However, since these materials are high boiling liquids or solids, distillation is often difficult. Accordingly, the esters are often purified by washing the reaction mixture with water and/or alkaline solution and drying the ester with a dehydrating agent such as calcium chloride.

The compositions herein described vary from high boiling point liquids to solids. Many of the liquids are very clear and colorless and are miscible with numerous organic solvents such as acetone, alcohol, chloroform, dioxane, benzene, xylene, toluene, ethyl ether, paraffin hydrocarbons, etc.

These compositions may be used for many purposes such as solvents, paint compositions, pharmaceuticals, plasticizers for various materials such as cellulose, vinyl, urea, phenol, acrylic or styrene resins or plastics, etc. In particular, the products are found to polymerize in the presence of catalysts, such as heat, light, oxygen, ozone, peroxides such as lauryl or benzoyl peroxide, or other oxygen catalyst, etc., to form products of desirable character.

By polymerization of these compounds it is possible to secure a wide range of polymers, some of which are extremely hard, while others are soft, flexible and often rubber-like in character. In general, the polymers thus obtained are transparent and colorless, although the polymer occasionally may be slightly yellow. If desired, the compounds herein described may be cast polymerized to form products having various shapes. These polymers in their finally cured state are substantially unaffected by acids, alkalies, water or organic solvents.

Many of the products obtained by polymerization of the materials herein contemplated are tougher and more resistant to shattering than are many of the polymers of the allyl esters of polybasic acids.

In accordance with the present invention, intermediate polymers which are fusible or thermoplastic also may be prepared. In general, such polymers are soluble in various organic solvents such as acetone, carbon tetrachloride, benzene, toluene, xylene, dioxane, etc. These fusible polymers may be further polymerized to an infusible state to form products similar to the infusible polymers mentioned above. Thus, the fusible polymer may be molded or otherwise shaped and polymerized by means of heat and/or light to form shaped products which are substantially infusible and insoluble and which retain their shape permanently.

This method of preparing infusible polymers is highly advantageous since it is often found that the production of cast polymers is complicated by the formation of fractures, bubbles, or other defects during polymerization. These difficulties are avoided through use of the fusible polymer. In addition, more completely polymerized products are obtainable by this means.

The fusible polymers herein described may be prepared by polymerizing the unsaturated compounds which contain at least two polymerizable unsaturated groups until substantial polymerization has occurred and interrupting polymerization before the polymer is converted into a gel. It is found that when polymerization of these materials is initiated, a fusible polymer is preliminarily formed. As polymerization proceeds, the monomer-polymer mixture is converted into a gel which is substantially infusible. This polymer does not fuse at atmospheric pressure. Further polymerization hardens the polymer to its final state of polymerization. By interrupting polymerization, it is possible to remove a portion or all of the monomer and to recover the fusible polymer substantially free from monomer or at least as a concentrate containing substantially less monomer than is present in the monomer-polymer mixture formed by ordinary polymerization of undiluted monomer. This interruption of polymerization may be effected by cooling, addition of inhibitors or by other methods as hereinafter more fully described.

The method of securing the fusible polymer is dependent upon the nature of the material which is undergoing polymerization. In general, it is possible to secure the fusible material in superior yields by polymerizing the monomer in a solution in which the fusible polymer is normally soluble. This polymer is generally soluble in the solvents which are capable of dissolving the usual thermoplastic vinyl or acrylic resins, such as polymethyl methacrylate or polyvinyl acetate. Thus, such solvents as acetone, dioxane, chloroform, toluene, benzene, carbon tetrachloride, methyl Cellosolve acetate, phenyl Cellosolve, dichlorethyl ether, xylene, tetralin, dibutyl phthalate, trichlorethylene, tetrachloroethane, etc., or mixtures of these solvents generally are found to be suitable. Solutions having concentrations of 10 to 60 percent of monomer yield satisfactory results.

In each case, the polymerization may be interrupted before the infusible product is produced. This may be accomplished by stopping polymerization as the mixture of monomer and polymer begins to grow viscous and before infusible gel formation occurs. In accordance with one illustrative method of interrupting polymerization, the polymer may be separated from the monomer by convenient methods, for example, by the addition of a compound in which the polymers are normally insoluble, such as methyl or ethyl alcohol, petroleum ether, water, ethylene glycol, etc. This process permits the isolation of the fusible polymer in a substantially pure state and is particularly adapted to use when the material is polymerized in solution. Polymerization may also be halted by lowering the temperature of the reaction mixture to a suitable degree, for example, to room temperature or below. In accordance with another effective method of interrupting polymerization, inhibitors such as pyrogallol, hydroquinone, aniline, phenylene diamine, sulphur, thiophenol, organic or inorganic salts or complexes of the reduced forms of metals such as copper, manganese, cobalt, nickel, etc., may be added to the polymer during polymerization or before polymerization has been initiated. When the fusible polymer is produced in solution, it also may be recovered by methods other than by treatment with a non-solvent, such as by slow evaporation or distillation of the solvent. These fusible polymers may be extruded, molded, shaped, or otherwise worked into desirable forms and after final shaping, the products may be completely hardened and rendered infusible by suitable methods hereinafter more fully set forth.

In polymerizing the compounds herein contemplated, the time required in order to initiate polymerization and to secure a fusible polymer varies widely in view of slight traces of peroxides or inhibitor which may be present. For this reason, the viscosity of the composition undergoing polymerization is observed and, in general, polymerization is interrupted after the viscosity of the composition has approximately doubled. In many cases, subjection of the compound to polymerization conditions for a period of one-half to two hours is sufficient, although some compounds polymerize somewhat more slowly.

Generally, it is preferred to conduct the polymerization in solution in order to secure improved yields. Thus, it is found that the presence of a solvent substantially improves the yield of fusible polymer. Likewise, addition of inhibitor may improve yields although in such a case the rate of polymerization is comparatively slow.

It is also possible to produce the fusible polymer in accordance with our invention without resorting to the use of solutions of the monomer, although the yield of polymer is, in general, somewhat lower than when a solvent is present. Thus, the monomer may be polymerized directly by use of heat and/or light, preferably in the presence of catalysts, such as air, ozone, oxygen, peroxides, and the like, and interrupting polymerization at the proper time. Since the polymerization proceeds without undue rapidity, with many of these materials, the reaction may be stopped before the infusible gel state is reached without difficulty, either by use of inhibitors or by cooling as hereinbefore mentioned.

The fusible polymer produced by polymerization of undiluted monomer may be molded to any desired shape and subsequently cured to the infusible state. In treating many of these materials, however, it is found that if considerable monomer is retained in the polymer, upon curing, considerable difficulty is encountered in securing complete or substantially complete polymerization of the residual monomer without formation of undesirably soft products or of products containing cracks, bubbles, and other defects. Accordingly, we have found that in most cases it is desirable to remove all or a portion of such monomer from the polymer prior to curing the polymer to its infusible state. In accordance with one convenient method, the monomer may be distilled from the polymer under conditions whereby the possibility of further polymerization is minimized, for example, by distillation in a vacuum, preferably at low temperatures and/or in the presence of added inhibitors. Similarly, the monomer may be extracted with a solvent in which the polymer is insoluble such as methyl or ethyl alcohol. Additionally, the polymer and monomer may be separated by dissolving the product in a solvent for both monomer and polymer and adding a nonsolvent to precipitate the fusible polymer.

The fusible polymers so produced have many characteristics which are similar to those of usual thermoplastic polymers. They are generally soluble in such organic solvents as acetone, dioxane, benzene, toluene, chloroform, ethyl Cellosolve acetate, triacetin, phenol Cellosolve, etc., and soften or flow upon heating under atmospheric pressure. They are precipitated from solutions by use of nonsolvents as white amorphous powders or as plastic semi-liquid resins.

In accordance with our invention, we have found that upon subjection of these fusible polymers to heating at temperatures somewhat above the softening point thereof, for a sufficient period of time, they are converted into infusible, insoluble, transparent, hard and wear-resistant products. The conversion may be assisted by the incorporation of usual polymerization catalysts, such as oxygen, ozone, air, peroxides, such as hydrogen peroxide, or benzoyl peroxide or other oxygen catalyst, basic or acidic catalysts, light, etc. By use of catalyst, it is found that the conversion of these products to the infusible state may be secured at lower temperatures. In order to secure transparent, uniform products, the polymerization should be controlled to permit the polymer to flow together, or if desired, to become completely molten prior to converting the polymer to its infusible state. The application of superatmospheric pressure assists the production of satisfactory products.

By operating in accordance with the present invention, we are able to prepare transparent, hard, infusible, molded products which have many of the desirable properties of the conventionally known thermoplastic resins. By proper regulation of the pressure and temperature, the fusible polymer may be extruded under such conditions that it becomes infusible as it leaves the extrusion die.

Since the fusible polymer is a thermoplastic, it often may be kept in the molten state for an indefinite period, particularly by incorporating an inhibitor such as hydroquinone, whereby conversion to the infusible state may be prevented. Likewise, polymerization may be delayed to such an extent that molten products may be obtained prior to polymerization by utilizing mixtures of catalysts and inhibitors. It is thus possible to form cast or molded products by melting a quantity of the fusible polymer with a quantity of polymerization inhibitor in a suitable mold. These products may then be converted to the infusible state by introduction of catalysts or by catalysts previously introduced. In some cases, polymerization of such products may be assisted by heating the molded or cast material in a molten or solid state in the presence of air, peroxides, etc. In accordance with a further modification, the cast or molded thermoplastic polymer may be coated with a solution of catalyst or a film of monomer or a solution of fusible polymer which contains high catalyst concentration may be applied to the surface of the molded product. Heat, pressure, and/or ultra violet light may be utilized to convert the polymer to the infusible state.

In addition, it is possible to effect a conversion of the exterior of the plastic without completely converting the interior thereof to the infusible, insoluble state. Thus, cast or molded products, made from the fusible polymers herein described may be subjected to local surface heating whereby the surface is converted without complete conversion of the interior. In this manner, it is possible to secure integral products possessing a great flexibility and resiliency, the surfaces of which are extremely hard and insoluble. Similar products may be secured by increasing the catalyst concentration of the fusible polymer adjacent the surface thereof by suitable methods, for example, by application of a coating containing catalysts as described above. Similar products may be secured by incorporation of an inhibitor in the interior of the product or by varying the the amount of plasticizer in the interior and exterior portions of the sheet, whereby the interior converts to a flexible gel due to the presence of added plasticizer.

A large number of inert substances may be incorporated with the fusible polymer before subjecting the molding condition. Suitable for such purposes are: plasticizers, softening agents or fillers such as dibutyl phthalate, dicyclohexyl phthalate, triacetin, tricresyl phosphate, natural or synthetic resins, pigments, including titanium dioxide, carbon black, chromic oxide, lead chromate, etc., and organic dyestuffs, such as methylene blue, methyl orange, etc.

If desired, similar products may be made from suitable copolymers, for example, the polyesters herein contemplated may be copolymerized with other compatible polymerizable materials such as acrylates or alpha-substituted acrylates, for example, methyl, allyl, or glycol methacrylate, vinyl acetate, vinyl chloride, styrene, allyl esters such as allyl acetate, maleate, fumarate, phthalate, succinate, oxalate, tartarate, or the corresponding vinyl, crotyl, methallyl, 2-chloroallyl, or other unsaturated alcohol esters to form desirable products in accordance with our invention. Products of widely varying composition containing from 2 to 90 percent of the modifying polymerizable material may be polymerized.

These resins are also suitable for many uses in the field of laminated products. For example, products of great strength, elasticity and adherence may be secured by impregnating fibrous sheets of paper, linen, canvas, etc., with the monomer or polymer herein described, forming a laminated product, and curing the same to an infusible state.

Leather, wood, paper, or other comparatively porous substances may be steeped in a solution of the fusible polymer or a molten body thereof, and one or more layers heated under pressure, generally in the presence of catalyst to convert the absorbed polymer to the infusible, insoluble form. Greatly improved products, particularly in regard to strength, water-proofing and electrical properties are obtained.

The polymers which we have prepared are capable of numerous uses such as in lacquers, or other coating compositions, molded articles, safety glass, and also in the cementing of mineral and other granules upon roofing, shingles, building siding, tile, etc. Where the composition is used for coating, it may be applied in solution or in solid form, either alone or in combination with natural or synthetic drying oils or resins and the like, the solvent removed and the coated article baked to render the surface infusible. In this manner, it is possible to surface other polymers which are less resistant to the action of solvents or of heat. When a coating of the fusible polymers prepared as herein described is deposited upon polymerized methyl methacrylate or similar polymer and the solvent removed, a coherent surface thereof is formed. Upon heating the coated article to suitable temperatures, this surface may be made transparent, hard and infusible.

Coatings may be applied to metal, glass, wood, synthetic resins, etc., surfaces by extrusion of the heated fusible polymer directly on the suitably-prepared surface. In similar manner, the surface may be heated and the polymer applied in powdered form, whereupon fusion occurs, first to give a smooth homogeneous film which may then be heat-heardened.

The process may also be extended to the production of mixed polymers or copolymers. Thus, the fusible polymer prepared in accordance with our invention may be mixed with other monomers or polymers, such as the monomer or polymer of methylmethacrylate, methyl chloracrylate, vinyl acetate, vinyl chloracetate, vinyl chloride, styrene, etc., and the mixture subjected to conditions of polymerization.

The following examples are illustrative:

Example I

Phosgene was bubbled into a solution containing 1690 grams of allyl lactate per liter of pyridine at a rate of 20 millimoles per minute while agitating the mixture and cooling to a temperature below about 15 to 20° C. After phosgene in the proportion of about 0.5 mole of phosgene per mole of allyl lactate had been introduced, the mixture was allowed to stand for one hour. Thereafter, the reaction mixture was acidified to the methyl orange endpoint and washed successively with equal volumes of water, dilute hydrochloric acid and dilute aqueous sodium hydroxide, and finally twice with water. The product was a colorless liquid which boiled at about 154° C. at a pressure of 4 mm. of mercury and had a density $(d_4^{20})$ of 1.22 and an index of refraction $(n_D^{20})$ of about 1.4466.

Example II

The carbonate of allyl ricinoleate was prepared by passing 50 grams of phosgene into a cooled mixture of 338 g. of allyl ricinoleate, 100 g. of pyridine, and 300 g. of benzene. The mixture was warmed to 40° C. and diluted with water. The oily layer was washed successively with water, dilute hydrochloric acid, and then with water. Benzene and volatile impurities were removed by evacuation at 20 mm. pressure while heating at 100° C. The residual light yellow oil polymerized to a transparent gel when heated at 70° C. with 5% of benzoyl peroxide catalyst.

Example III

The carbonate of methallyl ricinoleate was prepared by the same procedure as described in Example II using methallyl alcohol in lieu of allyl alcohol. The pale yellow oily product polymerized to a transparent elastic solid on prolonged heating at 75° C. with 5% of benzoyl peroxide.

Example IV

One mole (98.9 g.) of phosgene was slowly passed into a stirred mixture of 2 moles (288.2 g.) of methallyl lactate and 200 g. of pyridine, while keeping the temperature below 10° C. The resulting slurry was diluted with water and the oily product washed with water, dilute hydrochloric acid and finally with water. Distillation in vacuo gave colorless bis(α-carbomethallyl-oxyethyl) carbonate, (B.P. 170–180° C. at 4 mm. pressure) having the probable structural formula

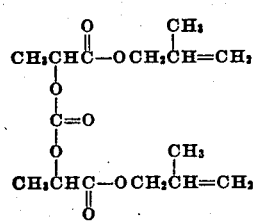

This ester polymerized to a transparent colorless solid when heated for 12 hrs. at 70° C. with 5% of benzoyl peroxide catalyst.

Example V 50 grams of phosgene were passed into a stirred mixture of 190 g. of allyl salicylate, 100 g. of pyridine, and 400 g. of benzene, while maintaining the temperature below 10° C. The reaction mixture was diluted with water, and the oily layer washed successively with water, dilute hydrochloric acid, and finally with water. Benzene and volatile impurities were removed by evacuation at 20 mm. pressure while heating at 100° C. The product crystallized on cooling, and was converted on melting with 5% of benzoyl peroxide, followed by heating at 75° C. into a light yellow transparent solid polymer.

Example VI

A quantity of the carbonate of allyl salicylate prepared as in Example V, was mixed with an equal weight of dioxane and 4% benzoyl peroxide on the basis of the weight of the monomer was introduced. The solution was heated, with stirring, at 80 to 85° C. until the viscosity had increased noticeably. Thereafter, the mixture was cooled and methanol was added to the point of turbidity. It was then added to 5 volumes of methanol with vigorous stirring. The polymer was separated by decantation, dissolved in acetone, reprecipitated with methanol and again recovered. The polymer was then dried under subatmospheric pressure to constant weight. A white granular solid was obtained. A quantity of this polymer was mixed with 5 percent benzoyl peroxide, placed in a mold and heated to 145° C. under a pressure of 2000 lbs. per square inch for 15 minutes and a transparent sheet of infusible, insoluble polymer was obtained.

Example VII

A quantity of the carbonate of methallyl lactate prepared as in Example IV was mixed with an equal weight of dioxane and 4% benzoyl peroxide on the basis of the weight of the polymer was introduced. The solution was heated, with stirring, at 80 to 85° C. until the viscosity doubled. Thereafter, the mixture was cooled and methanol was added to the point of turbidity. It was then added to 5 volumes of methanol with vigorous stirring. The polymer was separated by decantation, dissolved in acetone, reprecipitated with methanol and again recovered. The polymer was then dried under subatmospheric pressure to constant weight. A white fusible polymer was obtained. A quantity of this polymer was mixed with 5 percent benzoyl peroxide, placed in a mold and heated to 150° C. under a pressure of 2000 lbs. per sq. in. for 20 minutes. A transparent sheet of infusible, insoluble polymer was obtained.

Example VIII

A quantity of the carbonate of allyl ricinoleate prepared as in Example II was mixed with an equal weight of dioxane and 4% benzoyl peroxide on the basis of the weight of the polymer was introduced. The solution was heated, with stirring, at 80 to 85° C. until the viscosity doubled. Thereafter, the mixture was cooled and added to 5 volumes of methanol with vigorous stirring. The polymer was separated by decantation, dissolved in acetone, reprecipitated with methanol and again recovered. The polymer was then dried under subatmospheric pressure to constant weight. A white fusible polymer was obtained. A quantity of this polymer was mixed with 5 percent benzoyl peroxide, placed in a mold and heated to 145° C. under a pressure of 2000 lbs. per sq. in. for 20 minutes. A colorless sheet of infusible, insoluble, polymer was obtained.

Example IX

A quantity of the carbonate of methallyl ricinoleate prepared as in Example III was dissolved in an equal weight of dioxane and 4% benzoyl peroxide on the basis of the weight of the polymer was introduced. The solution was heated, with stirring, at 80 to 85° C. until the viscosity doubled. Thereafter, the mixture was cooled and methanol was added to the point of turbidity. It was then added to 5 volumes of methanol with vigorous stirring. The polymer was separated by decantation, dissolved in acetone, reprecipitated with methanol and again recovered. The polymer was then dried under subatmospheric pressure to constant weight. A light yellow gummy mass was obtained. A quantity of this polymer was mixed with four percent benzoyl peroxide, placed in a mold and heated to 150° C. under a pressure of 2000 lbs. per sq. in. for 20 minutes. A light yellow transparent sheet of infusible, insoluble polymer was obtained.

Example X

The process of Example VII was repeated using the carbonate of allyl lactate in lieu of the methallyl ester and a white fusible polymer was obtained which converted on heating with benzoyl peroxide to a transparent, infusible, insoluble polymer.

Example XI

Vinyl salicylate was obtained by heating a solution of salicylic acid in benzene containing a small amount of zinc salicylate with acetylene under pressure at 170° C. The ester was a liquid boiling at 75–85° C. under a pressure of 5 mm. of mercury. Two moles of vinyl salicylate was dissolved in 4 moles of pyridine and one mole of phosgene was introduced as a slow stream, while stirring vigorously and maintaining the temperature of the reaction mixture below 15° C. After the reaction was completed, cold water was added, precipitating the carbonate. The latter was washed with water and purified, yielding the carbonate of vinyl salicylate as a white, low-melting crystalline solid.

Example XII

The preparation of vinyl lactate was carried out by passing purified acetylene into a vigorously-stirred solution of anhydrous lactic acid containing mercuric oxide and a complex of boron trifluoride and acetic acid as catalyst. The reaction mixture was neutralized with anhydrous sodium acetate, and the vinyl lactate was recovered by distillation. After further rectification, the pure ester boiled at 50–60° C. under a pressure of 25 mm. of mercury. One mole of vinyl lactate was dissolved in two moles of pyridine, and one-half mole of phosgene was introduced as a slow stream into the solution, while maintaining the vigorous stirring and cooling to below 10° C. After the addition of reactants, the mixture was stirred for several hours and then washed with water, dried and distilled. The pure carbonate of vinyl lactate was obtained as the fraction boiling at 120–130° C. under a pressure of 4 mm. of mercury.

Although the present invention has been described with reference to the specific details of certain embodiments thereof, it is not intended that such details shall be regarded as limitations upon the scope of the invention except insofar as included in the accompanying claims. The term "poly" in the claims is intended to refer to the degree of esterification of the alcohol and is not intended to refer to polymerization.

We claim:

1. A neutral ester of (A) carbonic acid and (B) a monohydroxy ester of (a) a monohydroxy aromatic carboxylic acid and (b) a monohydric alcohol having an unsaturated linkage in an aliphatic straight chain having up to six carbon atoms.

2. The compound of claim 1 in which the monohydroxy organic carboxylic acid is salicylic acid.

3. A neutral ester of (A) carbonic acid and (B) allyl salicylate.

4. A neutral ester of (A) carbonic acid and (B) methallyl salicylate.

5. A neutral ester of (A) carbonic acid and (B) chlorallyl salicylate.

6. Polymer of the compound described in claim 1.

7. Polymer of the compound described in claim 3.

8. Polymer of the compound described in claim 4.

9. Polymer of the compound described in claim 5.

IRVING E. MUSKAT.
FRANKLIN STRAIN.